United States Patent Office 2,926,204

Patented Feb. 23, 1960

2,926,204

METHOD OF MAKING PROPARGYL CHLORIDE

Donald H. Wolfe, Lake Jackson, Tex., assignor to The Dow Chemical Company, Midland, Mich., a corporation of Delaware No Drawing. Application August 28, 1958
Serial No. 757,675

5 Claims. (Cl. 260—654)

This invention relates to an improved process for making propargyl chloride, H—C≡C—$CH_2Cl$, which is more accurately called 3-chloropropyne, and which is used extensively both as an organic reagent and as a constituent of various agricultural fumigant compositions.

Propargyl chloride has been made in various ways, the commonest being (1) by reaction between propargyl alcohol and thionyl chloride, with poor yields, and (2) by the gradual introduction of phosgene into propargyl alcohol and subsequent decomposition of the chloroformic acid propargyl ester (propargyl chlorocarbonate) in the presence of a tertiary amine, also with poor yields, usually of the order of 60–70 percent.

It is desired, and it is the principal object of the invention, to provide an improved method whereby the yield of propargyl chloride may be consistently of the order 85–95 percent of the theoretical yield.

The improved method of the present invention comprises the gradual introduction of propargyl alcohol to an excess over the stoichiometric quantity of phosgene in an inert solvent medium, while holding the temperature at a level not significantly above 5° C., and preferably from —10° C. to +5° C., then warming slightly to drive off unreacted and excess phosgene, at a temperature below 40° C., thereupon adding a tertiary amine as catalyst, and heating to drive off carbon dioxide and to flash distill the propargyl chloride as it is formed. The success of the process, as measured by the improvement in yield, is attributable directly to the order of introduction of the reagents, as will be shown hereinafter.

The inert solvent medium for the reaction may be an aromatic hydrocarbon, preferably one which boils higher than propargyl chloride, such as toluene, xylene, cymene, or ethylbenzene, or it may be an aliphatic hydrocarbon such as octane, or a mixture of hydrocarbons such as naphtha, gasoline, or kerosene, or it may be a chlorinated hydrocarbon such as ethylene chloride, trichloroethylene, perchloroethylene, chlorobenzene, trichlorobenzene, chloronaphthalene, or a chlorinated ether such as dichloroethylether or chlorinated phenylether. The only requirement is that the medium be a liquid which is inert to phosgene at the temperatures of exposure and that it be separable from the tertiary amine employed and from propargyl chloride (when that compound is not employed as the inert medium). The function of the solvent medium is primarily to assist in controlling temperature during the reaction, through its diluent effect.

When the reatcion is effected at atmospheric pressure, the temperature of the solution of phosgene to which the propargyl alcohol is added in the first step should be kept at or below 5° C. to prevent loss of phosgene and to prevent side reactions. Operation at temperatures in the range from —10° to +5° C. is preferred, as being most convenient, but any lower temperature at which the reaction mixture remains liquid is satisfactory. If desired, the reaction may be effected at pressures other than one atmosphere. Thus, reduced pressures may be used, but then the reaction temperature must be lowered accordingly to keep the reagents and the solvent from vaporizing. Similarly, superatmospheric pressures may be used, and in such case the reaction temperature may be permitted to rise somewhat above the preferred range stated above, but the temperature should neither reach the boiling point of phosgene at the prevailing pressure nor exceed 40° C., whichever is lower. Because of the convenience of operating at atmospheric pressure and the expense of doing otherwise, there is little or no reason for employing any other pressure.

The amount of phosgene employed should be in excess over the amount theoretically required to react with and esterify the propargyl alcohol to be mixed therewith. Specifically, there should be from 1.05 to 5 moles of phosgene for each mole of propargyl alcohol to be added. A satisfactory and convenient ratio is 1.5 to 1. At early stages of the reaction, of course, the amount of phosgene in the reaction vessel will be in much greater excess over the amount of propargyl alcohol added up to that time, but this excess will diminish gradually as the reaction proceeds. For this reason, to make the measurements simple, the amounts of reagents to be used are expressed in terms of total moles of phosgene to be provided for each mole of propargyl alcohol to be added thereto. The phosgene need not all be present before any propargyl alcohol is introduced, but in case only part of the phosgene is present initially, more should be added before the amount of propargyl alcohol introduced exceeds the limiting ratio of one mole of propargyl alcohol for 1.05 moles of phosgene.

It is critical to the success of the invention that the propargyl alcohol be added to the phosgene rather than adding phosgene to the propargyl alcohol.

When the esterification reaction is complete, upon completion of the introduction of propargyl alcohol, the remaining excess phosgene is stripped from the propargyl chlorocarbonate. This is most conveniently done by warming the mixture in the reaction vessel to a temperature above the boiling point of phosgene (near 8° C. at atmospheric pressure), but temperatures above 40° C. should be avoided at this stage. Other ways of stripping phosgene from the reaction mass are available, including reduced pressure or "vacuum" stripping, and stripping by means of bubbling a stream of inert gas (such as nitrogen) through the reaction mass.

When the free phosgene content of the reaction mass has been reduced to an insignificant low level, or to zero, there is added to the remaining liquid a tertiary amine or the salt of such amine. Among the tertiary amines found useful here are those having the formula $$RR'R''N$$

wherein R and R′ are alkyl (1–6C) or hydroxyalkyl radicals (2–4C) and R″ is phenyl, alkyl (1–4C) phenyl, cyclohexyl or one of the values of R or R′. Preferred tertiary amines for the purpose are dimethylaniline, triethylamine and triethanolamine. The amount of tertiary amine to be employed is not critical, since this material acts in an apparently catalytic manner, as is known in the art. A convenient, but by no means critical amount of tertiary amine is 5 to 10 percent of the weight of propargyl chlorocarbonate theoretically formed in the reaction.

After introduction of the tertiary amine, the mixture is heated to a temperature at which the propargyl chlorocarbonate (or its complex with the tertiary amine) decomposes with liberation of carbon dioxide to form propargyl chloride. The temperature required for this step is somewhat dependent on the particular tertiary amine employed, but is usually above 40° C. and often is a temperature in the range from 70° to 95° C. Whenever the decomposition temperature employed is above the boiling point of propargyl chloride at the effective pressure in the reaction zone, the propargyl chloride vaporizes and leaves the vessel with the conascent carbon dioxide. In such case, the effluent stream of gas and vapors must be cooled to condense the propargyl chloride so that it may be recovered. If the carbon dioxide is liberated at a temperature below the boiling point (under existing pressure conditions) of propargyl chloride, the latter may be recovered from the liquids left in the reaction zone by any of several methods, of which fractional distillation is one and extraction is another. For extraction as a recovery means, the liquid in the reactor may be stirred with water and enough acid to form a water-soluble salt of the tertiary amine. The water layer may be separated and the propargyl chloride can then be recovered by fractional distillation of the non-aqueous layer.

The first step of the process gives a quantitatively perfect yield of propargly chlorocarbonate based on the amount of propargyl alcohol employed. The second step gives a yield of 85 to 90 percent of the theoretical amount of propargyl chloride. This yield is increased slightly in subsequent runs if the tertiary amine from one run is used again in the second, because a small part of the propargyl chloride reacts under some conditions with the amine.

The following example illustrates the practice of the invention and shows, by way of comparison, the results obtained by the old procedure having a different order of mixing the initial reagents.

*Example*

In accordance with the procedure of this invention, 1.6 moles (160 g.) of phosgene was dissolved in 100 milliliters of xylene. The solution was contained in an externally chilled flask fitted with a motor-driven stirrer and a gooseneck outlet tube connected to a jacketed condenser which could be cooled by water or by iced brine, as desired. A dropping funnel was mounted so as to discharge into the flask. When the temperature of the phosgene solution had been reduced to about 0° C., propargyl alcohol was introduced slowly through the dropping funnel at a rate such as to prevent the heat of reaction from carrying the temperature above 5° C. In this manner there was added 1 mole (56 grams) of propargyl alcohol in the course of 90 minutes. Thereupon the cooling bath was removed and the flask and contents were allowed to attain room temperature. During this time much of the excess phosgene escaped from the reaction vessel and was condensed and recovered. The remaining phosgene was driven off by warming the flask and contents to 40° C. At this point, analysis of a representative small sample of the reaction mixture showed it to be free of both phosgene and propargyl alcohol and to consist of a xylene solution of propargyl chlorocarbonate, the yield being 100 percent of theoretical based on the propargyl alcohol employed. There was then added to the solution 10 grams of dimethylaniline and the mixture was heated to a temperature in the range from 95° to 100° C. As the temperature passed 70° C., evolution of carbon dioxide and distillation of propargyl chloride were observed. The higher temperature maintained both of these results at a practical rate so that, as long as propargyl chlorocarbonate remained in the flask, propargyl chloride was being distilled as a steady stream. When, after about 10 to 15 minutes at 95°–100° C., there was no further liquid distillate being produced, the product was found to be 64.4 grams (0.87 mole) of propargyl chloride—an 87 percent yield.

By way of contract (the following old procedure was followed, using the same apparatus. There was first put into the flask 2.41 moles (135 g.) of propargyl alcohol, dissolved in xylene. This solution was cooled to near 0° C. There was then introduced slowly 2.52 moles (250 g.) of phosgene dissolved in cold xylene, at a rate such that the reaction temperature was controlled in the range from —5° to +5° C. The phosgene was all added in about 30 minutes. There was then added dimethylaniline to serve as catalyst, and the mixture was heated as in the prior experiment, to drive off carbon dioxide and propargyl chloride and to collect the latter. The temperature during this operation, as before, was held near 95°–100° C. The propargyl chloride produced weighed 84.5 g. (1.13 moles), and represented a yield of 47 percent of the theoretical amount. The apparent disadvantage of the procedure just described may be due to the probability that, when phosgene is added to a momentary excess of propargyl alcohol, two competing reactions are possible. One of these produces the desired mono propargyl chlorocarbonate and the other produces dipropargyl carbonate. The last named compound cannot form propargyl chloride by simple decarbonation, as can the chlorocarbonate. To the extent, then, that phosgene is permitted to form the dipropargyl carbonate, the ultimate yield of propargyl chloride is diminished.

In other procedures of the prior art, yields of propargyl chloride up to about 70 percent have been reported, but these have involved procedures in which much of the initial charge of propargyl alcohol was unreacted, and the added recovery step, coupled with low yield, has made them unattractive. To illustrate, the teachings of German Patent No. 821,207 show that in the process there disclosed, less than 58 percent of the initial alcohol charge was reacted, and of this, only 85 percent went to the desired propargyl chlorocarbonate. While there was a yield of propargyl chloride near 70 percent, based on unrecovered alcohol, the efficiency of the process was of the order of 42 percent.

I claim:

1. In the preparation of propargyl chloride from propargyl alcohol and phosgene, the improvement which consists in adding the propargyl alcohol to a solution of phosgene in an inert liquid medium while the solution of phosgene is at a temperature below 40° C. and below the boiling point of phosgene at the pressure prevailing in the reaction vessel, at a rate such as to maintain the temperature below both of said limiting values, and discontinuing the introduction of propargyl alcohol before the amount thereof introduced into the reaction vessel exceeds a ratio of 1 mole of propargyl alcohol for each 1.05 moles of phosgene theretofore supplied to said vessel.

2. The improvement claimed in claim 1, wherein the reaction is effected at atmospheric pressure and at a temperature not in excess of 5° C. at which the reaction mixture is liquid.

3. The improvement claimed in claim 2, wherein the inert liquid medium is xylene.

4. The method which comprises the improvement claimed in claim 1, wherein after termination of the introduction of propargyl alcohol, the unreacted phosgene is stripped from the reaction mixture, a tertiary amine is added to the resulting solution of propargyl chlorocarbonate, and the amine-containing solution is heated to a temperature at which the said chlorocarbonate liberates carbon dioxide and the propargyl chloride so produced is distilled as formed.

5. The method claimed in claim 4, wherein the amine-containing solution is heated to a temperature near 95° to 100° C. at atmospheric pressure to effect release of carbon dioxide and flash distillation of propargyl chloride.

References Cited in the file of this patent

UNITED STATES PATENTS 2,274,611 Hurd ---------------- Feb. 24, 1942

FOREIGN PATENTS 821,207 Germany ------------- Nov. 15, 1951